United States Patent
Bertele et al.

[11] 4,013,349
[45] Mar. 22, 1977

[54] WIDE-ANGLE OBJECTIVE

[75] Inventors: Ludwig Bertele; Klaus W. Hildebrand, both of Heerbrugg, Switzerland

[73] Assignee: Wild Heerbrugg Aktiengesellschaft, Heerbrugg, Switzerland

[22] Filed: Apr. 17, 1975

[21] Appl. No.: 569,278

[30] Foreign Application Priority Data

Apr. 22, 1974 Switzerland .............. 5494/74

[52] U.S. Cl. .................. 350/214; 350/210; 350/215
[51] Int. Cl.² .......................................... G02B 9/64
[58] Field of Search .............. 350/215, 214, 210

[56] References Cited

UNITED STATES PATENTS

| | | | |
|---|---|---|---|
| 3,567,310 | 3/1971 | Bertele | 350/215 X |
| 3,700,312 | 10/1972 | Bertele | 350/215 |

FOREIGN PATENTS OR APPLICATIONS

| | | | |
|---|---|---|---|
| 1,915,396 | 9/1970 | Germany | 350/215 |
| 1,201,990 | 8/1970 | United Kingdom | 350/214 |

*Primary Examiner*—Paul A. Sacher
*Attorney, Agent, or Firm*—Werner W. Kleeman

[57] ABSTRACT

A wide-angle objective composed of six components separated by air spaces and located three at the object side and three at the image side of a diaphragm, said six lens components taken in consecutive order from the side of the object comprising: a first lens component with dispersing refractive power; a second lens component which follows an air space composed of a dispersing meniscus lens component curved towards the object side; a third lens component which follows a small air space and possessing a collecting refractive power and having a strongly convex curved outer surface facing the object side; a fourth lens component which follows the diaphragm space, said fourth lens component having a collecting refractive power; a fifth lens component comprising a meniscus lens component which is curved towards the image and assembled preferably from at least one dispersing and collecting lens; a sixth lens component with dispersing power which follows an air space and composed of at least one meniscus lens member curved towards the image; the difference of the reciprocal values of the radii of curvature of the lens surfaces bounding the diaphragm space is greater than 0.43/F and smaller than 1.3/F; and the axial spacing of the convex surfaces of the second and fifth lens components facing away from the diaphragm being in the order of between 0.58 F and 1.25 F and the focal length of the first lens component facing towards the object is greater than $-0.7$ F and smaller than $-1.6$ F.

2 Claims, 6 Drawing Figures

WIDE-ANGLE OBJECTIVE

BACKGROUND OF THE INVENTION

The present invention relates to an improved wide-angle objective composed of six components separated from each other by air spaces and located three at the object side of the diaphragm and three at the image side of the diaphragm.

In U.S. Pat. Nos. 3,567,310 and 3,700,312 there are taught wide-angle objectives including two inner components separated by a diaphragm, which inner components are surrounded on the object side by at least one dispersing meniscus lens member having its concave portion confronting the diaphragm and at the image side by one or more meniscus lens members curved towards the image, and which collectively each possess a dispersing refractive power. Both of the collecting inner elements are composed of the collecting system components situated closest to the diaphragm and the meniscus-shaped components separated therefrom and partially contain cemented surfaces.

SUMMARY OF THE INVENTION

It is a primary object of the invention to provide improved constructions of wide-angle objectives resulting in a structural reduction in size of such type objectives.

Experiments have shown that this is also possible even in the case of great demands placed upon the image output provided that the diaphragm space clearly assumes the shape of a collecting lens and thus can be more markedly employed for the correction of the astigmatic image errors. The imparting of such shape will be apparent from the fact that the spacing of the lens surfaces bounding the diaphragm space is smaller at the periphery than in the optical axis. Consequently, the meniscus-shaped outer elements can be displaced closer to the inner elements, resulting in a reduction of the required diameter of the outer lens elements which, in turn, reduces the total volume of the objective. It has been found that by virtue of these measures the aberration in the sagittal section within the width of the bundle of light rays governed by the aperture ratio does not become larger in comparison to known objectives of this type.

During such experiments it has also been found, depending upon the configuration or design of the diaphragm space by the lens surfaces bounding the same, it is possible to influence within certain limits the course of the sagittal image curve independent of the value for the Petzval sum $\Sigma(1/r) \cdot \Delta(1/n)$. Consequently, it becomes possible to obtain in the sagittal section for a predetermined adjustment plane an optimum resolving power or resolution for all image angles. In the above equation it is to be understood that reference character $r$ constitutes the radii of curvature of the lens surfaces and reference character $n$ the refractive indexes.

According to the invention both of the lens surfaces bounding or neighboring the diaphragm space possess radii of curvature which are calculated such that the difference of the reciprocal values thereof is greater than $0.43/F$ and smaller than $1.3/F$. Additionally, the axial spacing of the outer convex outer surfaces of both inner elements enclosing the diaphragm space varies between $0.58 F$ and $1.25 F$, and furthermore, the focal length of the lens element confronting the object and consisting of one or more meniscus lenses is in the order of between $-1.6 F$ and $-0.7 F$, wherein the reference character F represents the focal length of the entire objective.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
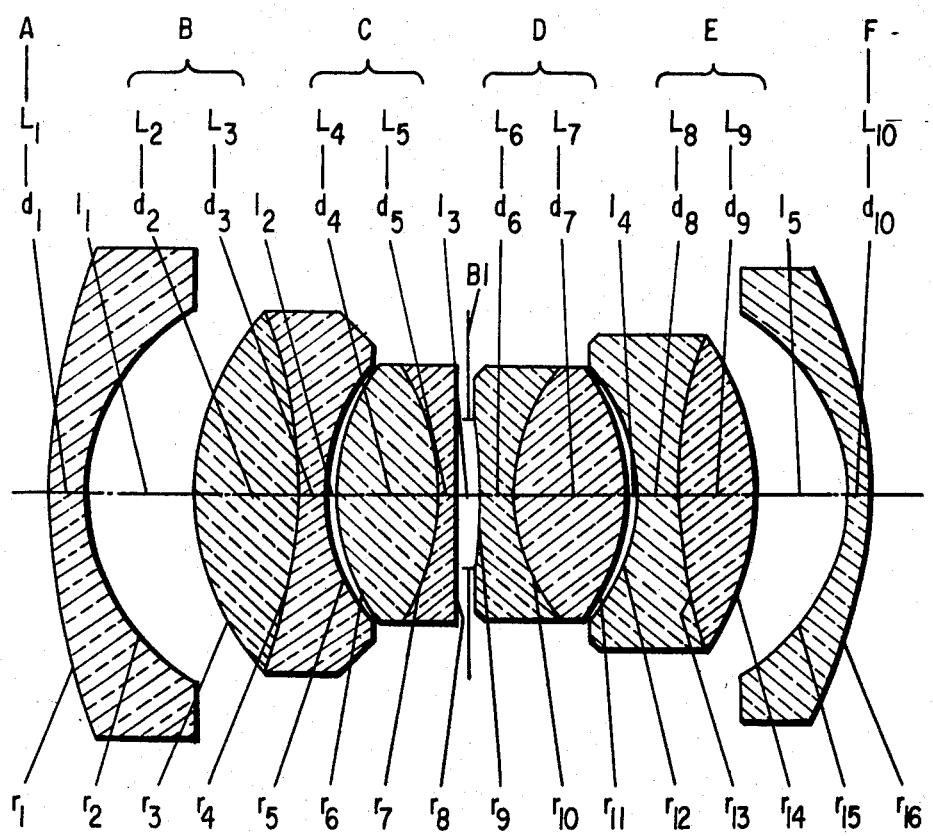
FIG. 1 illustrates a first embodiment of wide-angle objective.

Turning attention now generally to the drawings, it is to be understood that reference characters A and F designate the dispersing outer elements. Each of such consist of one or more meniscus lens members, which also can contain cemented surfaces, but such is not however absolutely necessary. Reference character B1 designates the diaphragm. The inner lens element arranged at the object side of the diaphragm is composed of the components B and C. The component B is constituted by a meniscus lens member curved towards the object and equipped with or without cemented surfaces, and the convex surface of which confronts the object. The component C is located directly neighboring the diaphragm B1 at the object side and contains a cemented surface having a radius of curvature preferably in the order of $-0.25 F$ to $-0.50 F$ and wherein the refractive index at the side of the object is greater than at the side of the image and also contains an outer surface which is markedly curved and confronts or faces towards the object.

The inner lens element arranged at the image side of the diaphragm B1 is composed of the components D and E. The component D is located at the image side directly neighboring the diaphragm and contains a concave cemented surface facing the image and which at the side of the image possesses a greater refractive index than at the side of the object and furthermore has a strongly convex curved outer surface which faces the image.

The component E is a meniscus lens which is curved towards the image and assembled preferably from at least one dispersing lens and one collecting lens. If lesser requirements are placed upon the chromatic correction then it is sufficient to also leave the component E as a single lens. Further, it is to be understood that the spacing between the components D and E can reduce down to null. With the same radii the components D and E can be cemented.

The invention is illustrated by eight Examples shown in FIGS. 1 through 6 of the accompanying drawings, each relating to an objective having a focal length F equal to 100 mm. In each Figure the six successive components starting from the object side are designated by the reference characters A, B, C, D, E, and F. The reference character L in conjunction with a number is used to denote the individual lenses. Furthermore, in the Examples given hereinafter, the symbols $r$ represent the radii of curvature, the symbols $l$ the air spaces. The symbol $n_d$ represents the refractive index for the helium line, and the symbol $\nu_d$ represents the Abbe number. The numbering is consecutive from the side of the object, and as indicated heretofore reference character B1 denotes the diaphragm.

Considering now the drawings in detail, each of the wide-angle objectives illustrated therein will be seen to be composed of six components A, B, C, D, E and F separated from each other by air spaces. Still, notwithstanding anything stated heretofore to the contrary it is to be appreciated that in certain cases it is possible to dispense with an air space between the components D and E. Three of the lens components, namely components A, B, C are located at the object side of the diaphragm B1 and the three other lens components D, E and F are disposed at the image side of the diaphragm.

The first lens component A reckoned from the side of the object may be one or a number of dispersing meniscus lens members curved towards the side of the object. Hence, such first lens component A may consist of a single dispersing meniscus lens member $L_1$ as shown in FIGS. 1 to 3 and 5, or two meniscus lens members $L_1$ and $L_2$ as shown in the arrangements of FIGS. 4 and 6.

After a larger air space $l_1$ (FIGS. 1 to 3, 5 and 6) or $l_2$ (FIG. 4) there follows the second lens component B which is also a dispersing meniscus lens component curved towards the object side. In the embodiments depicted in FIGS. 1 and 2 such second lens component consists of the cemented lens members $L_2$ and $L_3$, in the embodiments depicted in FIGS. 4 and 6 such consists of the cemented lens members $L_3$ and $L_4$, whereas in the embodiment of FIGS. 3 and 5 such second lens component consists of a single dispersing lens member $L_2$.

Figure 3:
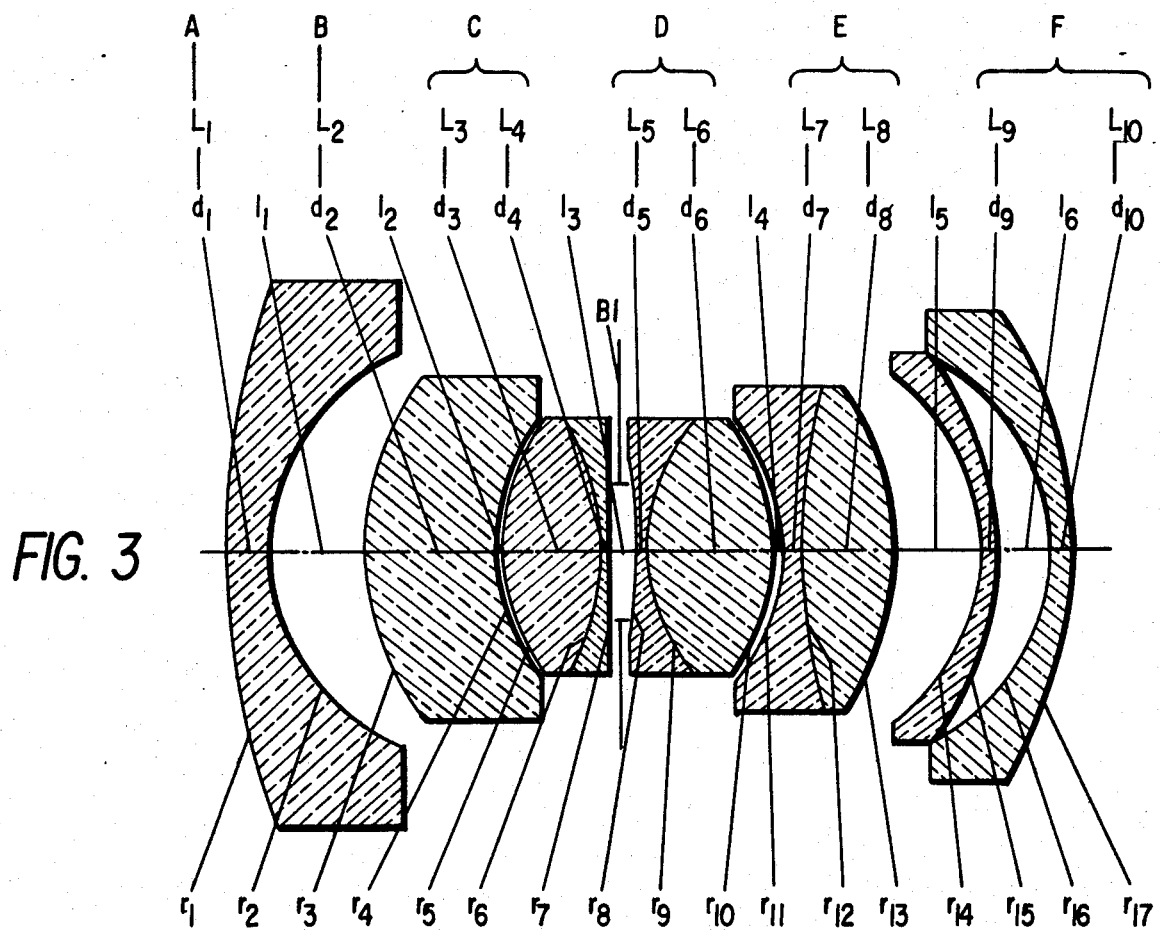
FIG. 3 illustrates a third embodiment of wide-angle objective.
Figure 4:
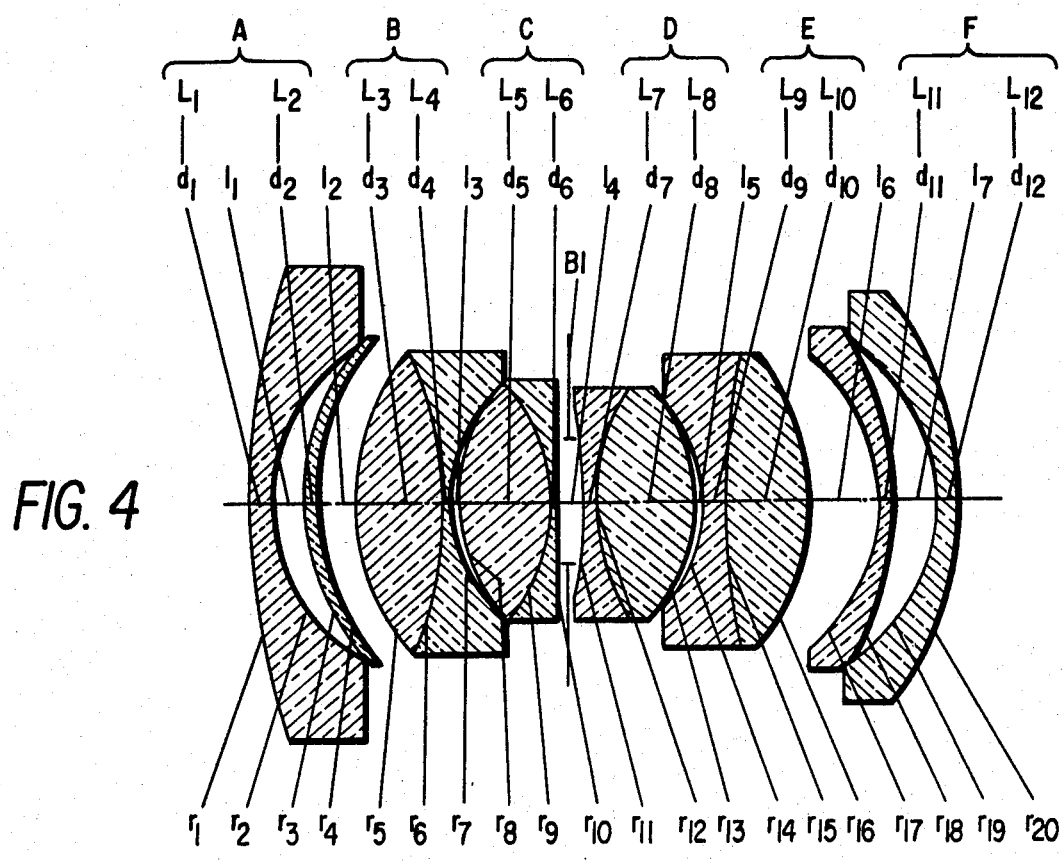
FIG. 4 illustrates a fourth embodiment of wide-angle objective.

The third lens component C follows an air space $l_2$ (FIGS. 1 to 3, 5 and 6) or $l_3$ (FIG. 4). This third lens component C comprises the lens members $L_4$, $L_5$ (FIGS. 1 and 2) or the lens members $L_3$, $L_4$ (FIGS. 3 and 5) or the lens members $L_5$, $L_6$ (FIGS. 4 and 6) and possesses a collecting refractive power. Furthermore, the lens component C has a strongly convex curved outer or extreme surface facing the object side. Additionally, this third lens component C possesses a cemented surface which is concave towards the object side and which at the side of the object possesses a greater refractive index than at the image side. The radius of curvature of the cemented surface which is convex towards the diaphragm of the third lens component is in the order of between −0.25 F and −0.50 F.

Figure 5:
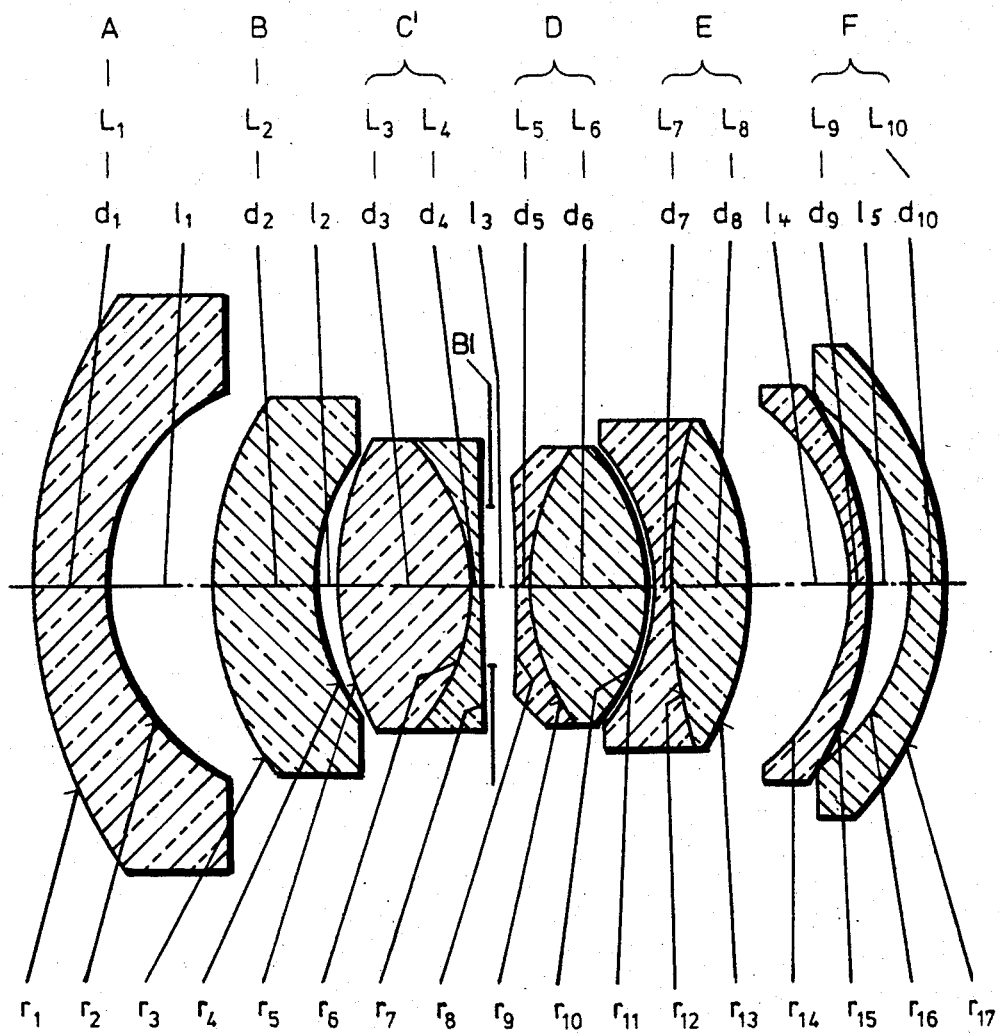
FIG. 5 illustrates a fifth embodiment of wide-angle objective.
Figure 6:
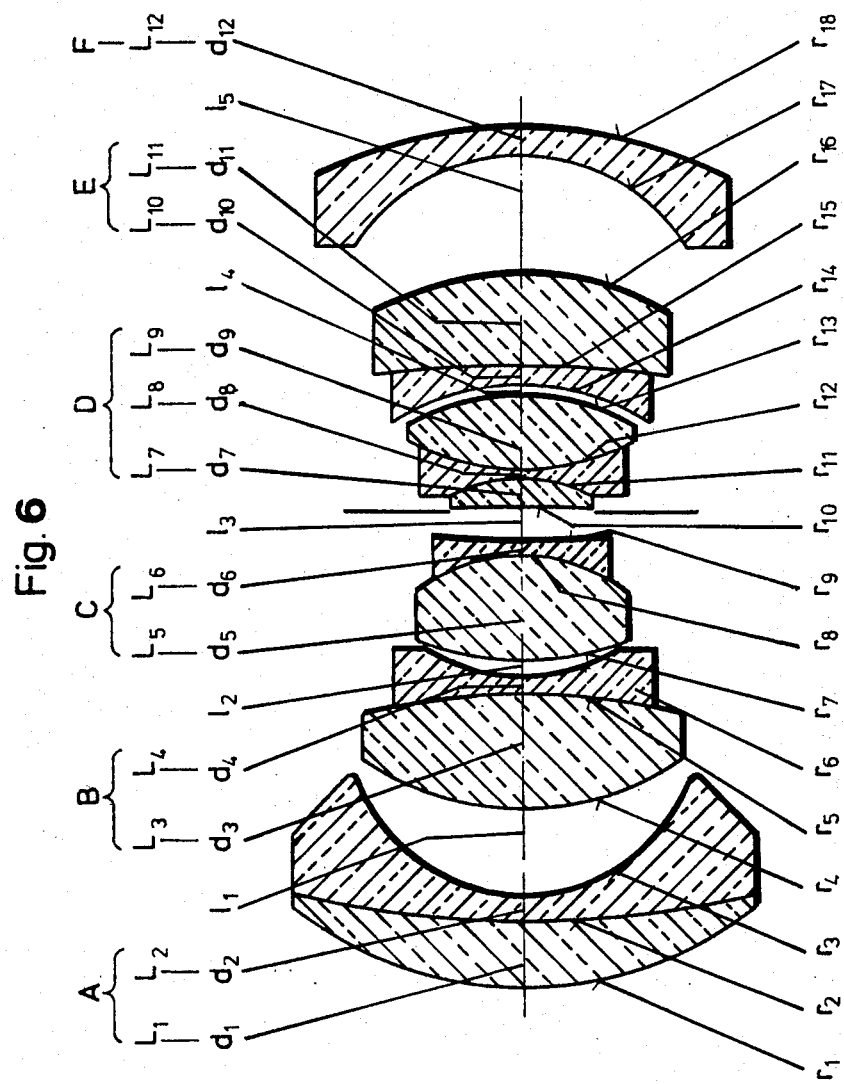
FIG. 6 illustrates a sixth embodiment of wide-angle objective.

The fourth lens component D follows the diaphragm region or space and comprises the cemented lens members $L_6$, $L_7$ (FIGS. 1 and 2) or the cemented lens members $L_5$, $L_6$ (FIGS. 3 and 5) or the cemented lens members $L_7$, $L_8$ (FIG. 4) or the cemented lens members $L_7$, $L_8$ and $L_9$ (FIG. 6). This fourth lens component D possesses a collecting refractive power and has a strongly convex curved outer surface which faces the image and further possesses a cemented surface which is concave in the direction facing the image and which at the side of the image exhibits a greater refractive index than at the side of the object.

Figure 2:
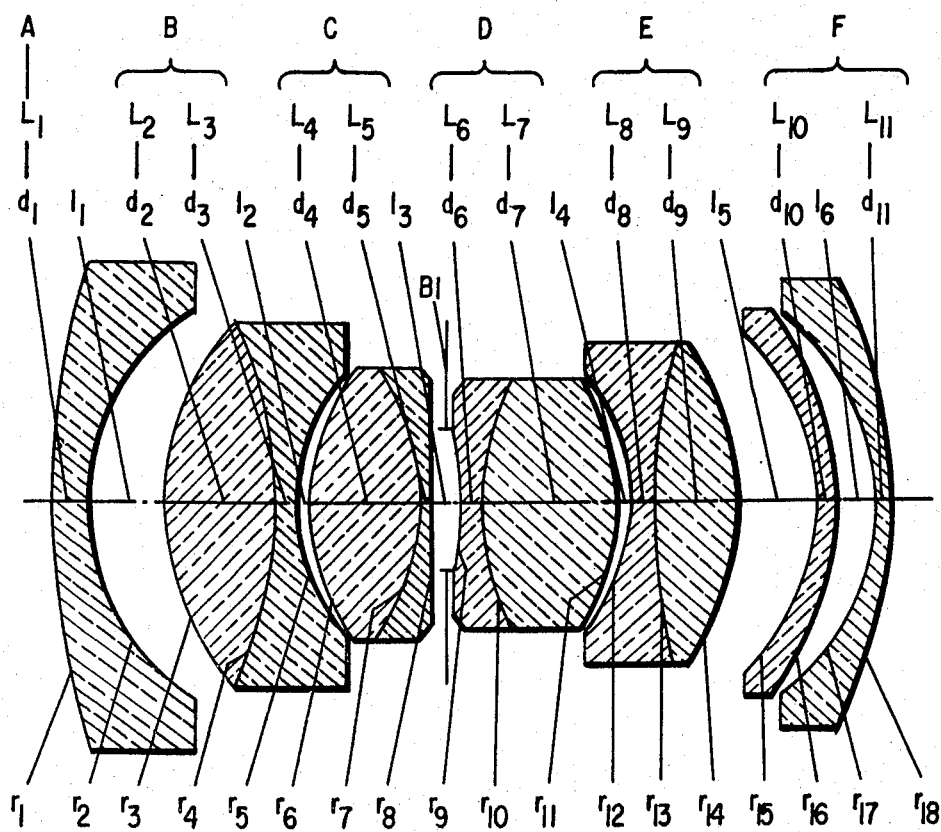
FIG. 2 illustrates a second embodiment of wide-angle objective.

The fifth lens component E defines a meniscus lens component which is curved towards the image and is preferably assembled from at least one dispersing lens and one collecting lens. In FIGS. 1 and 2 the lens component E consists of the cemented lens elements $L_8$ and $L_9$, in FIGS. 3 and 5 of the cemented lens elements $L_7$ and $L_8$, in FIG. 4 of the cemented lens elements $L_9$ and $L_{10}$, and finally in FIG. 6 of the cemented lens elements $L_{10}$ and $L_{11}$.

The sixth lens component F follows a larger air space $l_5$ (FIGS. 1 to 3 and 6) or $l_6$ (FIG. 4) or $l_4$ (FIG. 5) and defines one or a number of dispersing meniscus lens members which are curved towards the image. In FIG. 1 lens component F consists of the lens member $L_{10}$, in FIG. 2 of the lens members $L_{10}$ and $L_{11}$, in FIGS. 3 and 5 of the lens members $L_9$ and $L_{10}$, in FIG. 4 of the lens members $L_{11}$ and $L_{12}$, and in FIG. 6 of the lens member $L_{12}$.

The optical data of the various objectives depicted in FIGS. 1 to 5 are given in the following tables, in which each Example indicates adjacent thereto the number of the corresponding Figure illustrating it. Further, it is to be understood that in each of Examples 1, 2, 3, 5, 6, 7 and 8 the aperture ratio amounts to 1:4 and in Example 4 to 1:5.6. Further, in each of Examples 1, 2, 3, 4, and 8 the image angle amounts to ±40° and in Examples 5, 6 and 7 the image angle amounts to ±45°.

Example 1
(FIG. 1)

|     |               |               | $n_d$   | $\nu_d$ |
|-----|---------------|---------------|---------|---------|
| $L_1$ | $r_1 = +121.1$ | $d_1 = 6.25$ | 1.49782 | 67.0 |
|     | $r_2 = +35.73$ | $l_1 = 17.4$ | | |
| $L_2$ | $r_3 = +45.74$ | $d_2 = 16.5$ | 1.66892 | 45.0 |
|     | $r_4 = -75.30$ | | | |
| $L_3$ | $r_5 = +32.0$ | $d_3 = 4.4$ | 1.68064 | 37.2 |
|     |               | $l_2 = 1.94$ | | |
| $L_4$ | $r_6 = +37.0$ | $d_4 = 16.3$ | 1.65830 | 57.3 |
| $L_5$ | $r_7 = -41.3$ | $d_5 = 3.13$ | 1.51454 | 64.3 |
|     | $r_8 = \infty$ | | | |
|     |               | Bl. $l_3 = 4.65$ | | |
| $L_6$ | $r_9 = -131.7$ | $d_6 = 5.0$ | 1.58913 | 61.3 |
| $L_7$ | $r_{10} = +30.3$ | $d_7 = 19.45$ | 1.65113 | 55.0 |
|     | $r_{11} = -34.88$ | $l_4 = 1.69$ | | |
|     | $r_{12} = -30.13$ | | | |
| $L_8$ | $r_{13} = +81.6$ | $d_8 = 6.9$ | 1.65317 | 39.6 |
| $L_9$ | $r_{14} = -45.44$ | $d_9 = 12.86$ | 1.69100 | 54.7 |
|     | $r_{15} = -33.97$ | $l_5 = 16.31$ | | |
| $L_{10}$ | $r_{16} = -82.0$ | $d_{10} = 2.8$ | 1.64050 | 58.0 |

Example 2
(FIG. 2)

|     |               |               | $n_d$   | $\nu_d$ |
|-----|---------------|---------------|---------|---------|
| $L_1$ | $r_1 = +133.8$ | $d_1 = 6.37$ | 1.51000 | 64.2 |
|     | $r_2 = +141.624$ | $l_1 = 12.1$ | | |
| $L_2$ | $r_3 = +45.22$ | $d_2 = 18.98$ | 1.65147 | 41.9 |
|     | $r_4 = -76.43$ | | | |
| $L_3$ |  $r_5 = +31.82$ | $d_3 = 3.82$ | 1.68065 | 37.2 |
|     |               | $l_2 = 1.637$ | | |
|     | $r_6 = +36.94$ | | | |
| $L_4$ |               | $d_4 = 18.28$ | 1.64250 | 58.0 |
| $L_5$ | $r_7 = -35.67$ | $d_5 = 1.656$ | 1.55836 | 54.2 |
|     | $r_8 = -955.4$ | | | |

Example 2-continued
(FIG. 2)

|  |  |  | $n_d$ | $v_d$ |
|---|---|---|---|---|
|  | Bl. $r_3 = 4.52$ |  |  |  |
|  | $r_9 = -1124.2$ |  |  |  |
| $L_6$ |  | $d_6 = 3.18$ | 1.46450 | 65.8 |
|  | $r_{10} = + 45.86$ |  |  |  |
| $L_7$ |  | $d_7 = 23.12$ | 1.65160 | 57.3 |
|  | $r_{11} = - 38.54$ |  |  |  |
|  | $l_4 = 1.58$ |  |  |  |
|  | $r_{12} = - 34.42$ |  |  |  |
| $L_8$ |  | $d_8 = 5.10$ | 1.65317 | 39.6 |
|  | $r_{13} = + 127.4$ |  |  |  |
| $L_9$ |  | $d_9 = 13.38$ | 1.69100 | 54.7 |
|  | $r_{14} = - 46.78$ |  |  |  |
|  | $l_5 = 14.65$ |  |  |  |
|  | $r_{15} = - 38.09$ |  |  |  |
| $L_{10}$ |  | $d_{10} = 2.55$ | 1.60311 | 60.6 |
|  | $r_{16} = - 54.78$ |  |  |  |
|  | $l_6 = 7.00$ |  |  |  |
|  | $r_{17} = - 38.09$ |  |  |  |
| $L_{11}$ |  | $d_{11} = 3.18$ | 1.60311 | 60.6 |
|  | $r_{18} = - 72.04$ |  |  |  |

Example 3
(FIG. 2)

|  |  |  | $n_d$ | $v_d$ |
|---|---|---|---|---|
|  | $r_1 = +144.0$ |  |  |  |
| $L_1$ |  | $d_1 = 6.00$ | 1.51680 | 64.2 |
|  | $r_2 = + 36.5$ |  |  |  |
|  | $l_1 = 12.0$ |  |  |  |
|  | $r_3 = + 41.0$ |  |  |  |
| $L_2$ |  | $d_2 = 17.0$ | 1.65147 | 41.9 |
|  | $r_4 = - 69.0$ |  |  |  |
| $L_3$ |  | $d_3 = 1.0$ | 1.68065 | 37.2 |
|  | $r_5 = + 28.7$ |  |  |  |
|  | $l_2 = 1.4$ |  |  |  |
|  | $r_6 = + 34.3$ |  |  |  |
| $L_4$ |  | $d_4 = 19.0$ | 1.64250 | 58.0 |
|  | $r_7 = - 36.1$ |  |  |  |
| $L_5$ |  | $d_5 = 1.9$ | 1.55836 | 54.2 |
|  | $r_8 = -800.0$ |  |  |  |
|  | Bl. $l_3 = 4.0$ |  |  |  |
|  | $r_9 = - 97.0$ |  |  |  |
| $L_6$ |  | $d_6 = 1.0$ | 1.4645 | 65.8 |
|  | $r_{10} = + 47.0$ |  |  |  |
| $L_7$ |  | $d_7 = 21.7$ | 1.6515 | 55.5 |
|  | $r_{11} = - 36.0$ |  |  |  |
|  | $l_4 = 1.4$ |  |  |  |
|  | $r_{12} = - 32.8$ |  |  |  |
| $L_8$ |  | $d_8 = 5.5$ | 1.65412 | 39.6 |
|  | $r_{13} = +115.0$ |  |  |  |
| $L_9$ |  | $d_9 = 12.0$ | 1.66882 | 57.4 |
|  | $r_{14} = 41.3$ |  |  |  |
|  | $l_5 = 14.0$ |  |  |  |
|  | $r_{15} = - 35.7$ |  |  |  |
| $L_{10}$ |  | $d_{10} = 2.3$ | 1.62041 | 60.3 |
|  | $r_{16} = - 52.0$ |  |  |  |
|  | $l_6 = 7.0$ |  |  |  |
|  | $r_{17} = - 34.95$ |  |  |  |
| $L_{11}$ |  | $d_{11} = 3.2$ | 1.62041 | 60.3 |
|  | $r_{18} = - 61.9$ |  |  |  |

Example 4
(FIG. 2)

|  |  |  | $n_d$ | $v_d$ |
|---|---|---|---|---|
|  | $r_1 = +122.0$ |  |  |  |
| $L_1$ |  | $d_1 = 5.0$ | 1.51895 | 57.4 |
|  | $r_2 = + 28.0$ |  |  |  |
|  | $l_1 = 89\ 9.3$ |  |  |  |
|  | $r_3 = + 31.6$ |  |  |  |
| $L_2$ |  | $d_2 = 12.3$ | 1.62606 | 39.0 |
|  | $r_4 = - 71.0$ |  |  |  |
| $L_3$ |  | $d_3 = 1.0$ | 1.68064 | 37.2 |
|  | $r_5 = + 25.1$ |  |  |  |
|  | $l_2 = 1.3$ |  |  |  |
|  | $r_6 = + 28.80$ |  |  |  |
| $L_4$ |  | $d_4 = 12.3$ | 1.64250 | 58.0 |
|  | $r_7 = - 33.25$ |  |  |  |
| $L_5$ |  | $d_5 = 1.5$ | 1.53375 | 55.3 |
|  | $r_8 = -470.0$ |  |  |  |
|  | Bl. $l_3 = 4.0$ |  |  |  |
|  | $r_9 = - 69.0$ |  |  |  |
| $L_6$ |  | $d_6 = 1.0$ | 1.46450 | 65.8 |
|  | $r_{10} = + 40.0$ |  |  |  |

Example 4-continued
(FIG. 2)

|  |  |  | $n_d$ | $v_d$ |
|---|---|---|---|---|
| $L_7$ | $r_{11} = - 30.90$ | $d_7 = 16.0$ | 1.63854 | 55.4 |
|  |  | $l_4 = 1.2$ |  |  |
|  | $r_{12} = - 25.85$ |  |  |  |
| $L_8$ |  | $d_8 = 1.0$ | 1.65412 | 39.6 |
|  | $r_{13} = +105.0$ |  |  |  |
| $L_9$ |  | $d_9 = 13.1$ | 1.62041 | 60.3 |
|  | $r_{14} = - 31.60$ |  |  |  |
|  |  | $l_5 = 13.0$ |  |  |
|  | $r_{15} = - 28.78$ |  |  |  |
| $L_{10}$ |  | $d_{10} = 2.0$ | 1.60310 | 65.4 |
|  | $r_{16} = - 41.90$ |  |  |  |
|  |  | $l_6 = 7.0$ |  |  |
|  | $r_{17} = - 28.78$ |  |  |  |
| $L_{11}$ |  | $d_{11} = 5.0$ | 1.60310 | 65.4 |
|  | $r_{18} = - 47.20$ |  |  |  |

Example 5
(FIG. 3)

|  |  |  | $n_d$ | $v_d$ |
|---|---|---|---|---|
|  | $r_1 = + 161.0$ |  |  |  |
| $L_1$ |  | $d_1 = 8.70$ | 1.50137 | 56.4 |
|  | $r_2 = + 41.70$ |  |  |  |
|  | $l_1 = 20.0$ |  |  |  |
|  | $r_3 = + 54.05$ |  |  |  |
| $L_2$ |  | $d_2 = 26.2$ | 1.69100 | 54.7 |
|  | $r_4 = + 36.0$ |  |  |  |
|  | $l_2 = 1.65$ |  |  |  |
|  | $r_5 = + 42.0$ |  |  |  |
| $L_3$ |  | $d_3 = 20.0$ | 1.65160 | 58.5 |
|  | $r_6 = - 41.50$ |  |  |  |
| $L_4$ | $r_7 = \infty$ | $d_4 = 1.5$ | 1.56013 | 47.2 |
|  | Bl. $l_3 = 5.2$ |  |  |  |
|  | $r_8 = -232.0$ |  |  |  |
| $L_5$ |  | $d_5 = 2.3$ | 1.50137 | 56.4 |
|  | $r_9 = + 44.0$ |  |  |  |
| $L_6$ |  | $d_6 = 26.0$ | 1.64250 | 58.0 |
|  | $r_{10} = - 43.60$ |  |  |  |
|  | $l_4 = 1.9$ |  |  |  |
|  | $r_{11} = - 38.10$ |  |  |  |
| $L_7$ |  | $d_7 = 4.3$ | 1.65715 | 36.7 |
|  | $r_{12} = +190.0$ |  |  |  |
| $L_8$ |  | $d_8 = 17.5$ | 1.69680 | 54.4 |
|  | $r_{13} = - 54.05$ |  |  |  |
|  |  | $l_5 = 17.7$ |  |  |
|  | $r_{14} = - 42.0$ |  |  |  |
| $L_9$ |  | $d_9 = 3.3$ | 1.55232 | 63.5 |
|  | $r_{15} = - 60.70$ |  |  |  |
|  |  | $l_6 = 9.8$ |  |  |
|  | $r_{16} = - 43.82$ |  |  |  |
| $L_{10}$ |  | $d_{10} = 4.8$ | 1.55232 | 63.5 |
|  | $r_{17} = - 83.40$ |  |  |  |

Example 6
(FIG. 4)

|  |  |  | $n_d$ | $v_d$ |
|---|---|---|---|---|
|  | $r_1 = + 160.0$ |  |  |  |
| $L_1$ |  | $d_1 = 4.0$ | 1.50378 | 66.9 |
|  | $r_2 = + 37.50$ |  |  |  |
|  | $l_1 = 6.5$ |  |  |  |
|  | $r_3 = + 48.0$ |  |  |  |
| $L_2$ |  | $d_2 = 2.0$ | 1.46450 | 65.8 |
|  | $r_4 = + 52.30$ |  |  |  |
|  | $l_2 = 5.7$ |  |  |  |
|  | $r_5 = + 45.50$ |  |  |  |
| $L_3$ |  | $d_3 = 20.0$ | 1.65147 | 41.9 |
|  | $r_6 = - 80.0$ |  |  |  |
| $L_4$ |  | $d_4 = 1.4$ | 1.68065 | 37.2 |
|  | $r_7 = + 31.72$ |  |  |  |
|  | $l_3 = 1.9$ |  |  |  |
|  | $r_8 = + 37.10$ |  |  |  |
| $L_5$ |  | $d_5 = 19.6$ | 1.65160 | 58.5 |
|  | $r_9 = - 37.75$ |  |  |  |
| $L_6$ |  | $d_6 = 1.6$ | 1.55836 | 54.2 |
|  | $r_{10} = -800.0$ |  |  |  |
|  | Bl. $l_4 = 4.54$ |  |  |  |
|  | $r_{11} = - 135.2$ |  |  |  |
| $L_7$ |  | $d_7 = 3.0$ | 1.49782 | 67.0 |
|  | $r_{12} = + 44.0$ |  |  |  |

Example 6-continued
(FIG. 4)

|  |  |  | $n_d$ | $v_d$ |
|---|---|---|---|---|
| $L_8$ | $r_{13} = -38.44$ | $d_8 = 20.0$ | 1.65160 | 57.3 |
|  | $r_{14} = -34.24$ | $l_5 = 1.4$ |  |  |
| $L_9$ |  | $d_9 = 5.0$ | 1.65317 | 39.6 |
|  | $r_{15} = +127.4$ |  |  |  |
| $L_{10}$ |  | $d_{10} = 17.0$ | 1.69100 | 54.9 |
|  | $r_{16} = -48.10$ |  |  |  |
|  | $r_{17} = -37.90$ | $l_6 = 15.6$ |  |  |
| $L_{11}$ |  | $d_{11} = 2.6$ | 1.60311 | 60.6 |
|  | $r_{18} = -60.50$ | $l_7 = 8.2$ |  |  |
|  | $r_{19} = -39.50$ |  |  |  |
| $L_{12}$ |  | $d_{12} = 4.8$ | 1.60361 | 53.6 |
|  | $r_{20} = -68.0$ |  |  |  |

Example 7
(FIG. 5)

|  |  |  | $n_d$ | $v_d$ |
|---|---|---|---|---|
| $L_1$ | $r_1 = +83.0$ | $d_1 = 12.0$ | 1.50137 | 56.4 |
|  | $r_2 = 0 + 36.25$ | $l_1 = 18.0$ |  |  |
| $L_2$ | $r_3 = +52.50$ | $d_2 = 17.6$ | 1.70181 | 41.0 |
|  | $r_4 = +36.60$ | $l_2 = 4.0$ |  |  |
| $L_3$ | $r_5 = +50.0$ | $d_3 = 22.4$ | 1.65830 | 57.3 |
| $L_4$ | $r_6 = -34.2$ | $d_4 = 2.1$ | 1.55836 | 54.2 |
|  | $r_7 = +950.0$ |  |  |  |
|  | $r_8 = -310.0$ | $l_3 = 5.8$ |  |  |
| $L_5$ |  | $d_5 = 2.3$ | 1.55836 | 54.2 |
|  | $r_9 = +39.0$ | $d_6 = 20.0$ | 1.64250 | 58.0 |
| $L_6$ |  |  |  |  |
|  | $r_{10} = -34.0$ |  | Cemented |  |
|  | $r_{11}{}' = -34.0$ |  |  |  |
| $L_7$ | $r_{12} = -100.0$ | $d_7 = 3.0$ | 1.68064 | 37.2 |
| $L_8$ |  | $d_8 = 13.0$ | 1.68248 | 48.2 |
|  | $r_{13} = -50.5$ | $l_4 = 17.0$ |  |  |
|  | $r_{14} = -37.0$ |  |  |  |
| $L_9$ |  | $d_9 = 3.0$ | 1.51680 | 64.2 |
|  | $r_{15} = -55.5$ | $l_5 = 7.0$ |  |  |
|  | $r_{16} = -36.55$ |  |  |  |
| $L_{10}$ |  | $d_{10} = 6.0$ | 1.1680 | 64.2 |
|  | $r_{17} = -55.4$ |  |  |  |

Finally, it will be recalled that according to the teachings of the invention the differences of the reciprocal values of the radii of curvature of the lens surfaces bounding the diaphragm space is greater than 0.43/F and smaller than 1.3/F, and further the axial spacing of the convex surfaces of the second and fifth lens components, and which convex surfaces face away from the diaphragm, is in the order of between 0.58 F and 1.25 F, and finally, the focal length of the first lens component facing the object is greater than −0.7 F and smaller than −1.6 F.

Now there will be given hereinafter specific values of the above-mentioned features for the individual Examples 1 to 7, wherein it is to be appreciated that the difference of the reciprocal values of the radii of curvature of the lens surfaces enclosing the diaphragm space is designated in the following Table by reference character $g$, the spacing of the convex outer surfaces of the lens components B and E by reference character $s$ and the focal length of the lens component A by reference character $f_1$.

TABLE

| Example | 1 | 2 | 3 | 4 | 5 | 6 | 7 | 8 |
|---|---|---|---|---|---|---|---|---|
| q | 0.76 F | 0.70 F | 0.91 F | 1.24 F | 0.43 F | 0.62 F | 0.43 F | 0.3 F |
| s | 0.93F | 0.92F | 0.86F | 0.64F | 1.07F | 0.95F | 0.90F | 0.86F |
| $f_1$ | −1.04F | −1.01F | −0.96F | −0.70F | −1.15F | −1.07F | −1.55F |  |

While there is shown and described present preferred embodiments of the invention, it is to be distinctly understood that the invention is not limited thereto, but may be otherwise variously embodied and practiced within the scope of the following claims.

Accordingly, what is claimed is:

1. A wide-angle objective composed of six components separated from each other and located three at the object side of diaphragm and three at the image side of such diaphragm, said six lens components taken in consecutive order from the side of the object comprising:

a. a first lens component with dispersing refractive power composed of at least one meniscus lens member curved towards the object side;

b. a second lens component which follows an air space composed of a dispersing meniscus lens component curved towards the object side;

c. a third lens component which follows a small air space and possessing a collecting refractive power and having a strongly convex curved outer surface facing the object side, said third lens component comprising at least two lens members and having a convex cemented surface facing the object side which at the side of the object possesses a greater refractive index than at the image side, one of said two lens members is a dispersing lens member situated closest to the diaphragm;

d. a fourth lens component which follows the diaphragm space, said fourth lens component having a collecting refractive power and strongly convex curved outer surface which faces the image and possesses a concave cemented surface facing the image and which at the side of the image exhibits a greater refractive index than at the side of the object;

e. a fifth lens component comprising a dispersing meniscus lens component which is curved towards the image;

f. a sixth lens component with dispersing power which follows an air space and composed of at least one meniscus lens member curved towards the image;

g. the difference of the reciprocal values of the radii of curvature of the lens surfaces bounding the diaphragm space being greater than 0.43/F and smaller than 1.3/F;

h. the axial spacing of the convex surfaces of the second and fifth lens components, and which convex surfaces face away from the disphragm, is in the order of about between 0.64 F and 1.1 F;

i. the focal length of the first lens component facing the object is greater than −0.7 F and smaller than −1.6 F; and j. wherein the symbol F represents the focal length of the entire objective.

2. The wide-angle objective as defined in claim 1, wherein the radius of curvature of the cemented surface of the third lens component, and which cemented surface is convex towards the diaphragm, is in the order of between −0.28 F and −0.42 F.

* * * * *